(12) United States Patent
Lady (10) Patent No.: US 7,107,939 B2
(45) Date of Patent: Sep. 19, 2006

(54) ANIMAL TRAINING APPARATUS AND METHOD

(76) Inventor: Linda J. Lady, 34322 Eucalyptus Ter., Fremont, CA (US) 94555

( * ) Notice: Subject to any disclaimer, the term of this patent is extended or adjusted under 35 U.S.C. 154(b) by 0 days.

(21) Appl. No.: 10/341,930

(22) Filed: Jan. 14, 2003

(65) Prior Publication Data

US 2004/0000273 A1    Jan. 1, 2004

Related U.S. Application Data

(60) Provisional application No. 60/392,746, filed on Jun. 27, 2002.

(51) Int. Cl.
*A01K 15/02*    (2006.01)

(52) U.S. Cl. .................... 119/792; 119/863; 119/907; 54/71

(58) Field of Classification Search ............... 119/792, 119/793, 794, 786, 787, 788, 770, 771, 856, 119/863, 864, 905, 907; 54/71
See application file for complete search history.

(56) References Cited

U.S. PATENT DOCUMENTS

| 1,685,435 A |   | 9/1928 | Philbrick |
|---|---|---|---|
| 2,026,383 A | * | 12/1935 | Gyulay ........................ 119/863 |
| 2,778,335 A | * | 1/1957 | Hirsch ......................... 119/793 |
| 3,768,445 A | * | 10/1973 | Sorrels ........................ 119/856 |
| 3,769,939 A |   | 11/1973 | Wais et al. |
| 4,676,198 A | * | 6/1987 | Murray ........................ 119/771 |
| 4,838,206 A | * | 6/1989 | Anderson et al. ............ 119/831 |
| 5,199,383 A | * | 4/1993 | Lagana ........................ 119/858 |
| 5,247,905 A |   | 9/1993 | Arakawa |
| 5,325,819 A |   | 7/1994 | Krauss |
| 5,329,885 A | * | 7/1994 | Sporn .......................... 119/864 |
| 5,511,515 A |   | 4/1996 | Brown et al. |
| 5,676,093 A | * | 10/1997 | Sporn .......................... 119/792 |
| 5,893,339 A | * | 4/1999 | Liu ............................... 119/792 |
| 5,896,831 A | * | 4/1999 | Alpert ......................... 119/856 |
| 6,085,694 A |   | 7/2000 | Simon |
| 6,167,844 B1 |   | 1/2001 | Cantrell et al. |
| 6,314,915 B1 | * | 11/2001 | Pope et al. .................. 119/712 |
| 6,450,130 B1 | * | 9/2002 | Goldberg ..................... 119/792 |

* cited by examiner

*Primary Examiner*—Yvonne R. Abbott
(74) *Attorney, Agent, or Firm*—McNichols Randlick O'Dea, et al.; Everitt Beers (57) ABSTRACT

An animal training apparatus is comprised of a leash connector attached to a chest portion of a harness. The harness is arranged for preventing the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for applying a rotating force to the animal when the animal moves forwards of the handler and pulls on the leash connector. The animal is prevented by the rotational force from pulling further.

17 Claims, 7 Drawing Sheets

Fig. 7

ANIMAL TRAINING APPARATUS AND METHOD

CROSS REFERENCE TO RELATED APPLICATIONS

I claim the benefit of provisional application No. 60/392,746 filed on Jun. 27, 2002.

BACKGROUND OF THE INVENTION

1. Field of the Invention

The invention broadly relates to animal harnesses and leashes.

2. Prior Art

An animal leash is typically connected to a collar worn around the neck of an animal. The collar is free to rotate around the neck. An animal, such as a dog, which has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck. Many types of animals have an opposition reflex which makes them instinctively move toward the part of their bodies which feel pressure. Since the dog feels pressure at the front part of the collar when the leash is rotated to the back, the collar encourages the dog to pull away from its handler with even greater force. As another example, the opposition reflex of a horse causes it to turn towards the side where the rider's leg applies pressure.

In addition to collars, there are also animal harnesses that wrap around the torso. A typical harness has a leash attachment at the back of the animal, but a back-mounted leash cannot be used to give the animal cues for learning commands such as sit, down, and come. The back-mounted leash also signals the animal to pull on the leash. Some prior art harnesses discourage pulling behavior by providing devices that rub, chafe, or hobble the animal's front legs, but these devices cause stress and discomfort.

BRIEF SUMMARY OF THE INVENTION

Accordingly, the objects of the present animal training apparatus and method are:
- to prevent an animal from pulling on its leash;
- to facilitate applying turning signals to the animal;
- to be adjustable for fitting different size animals;
- to be comfortable to wear;
- to not rub the armpits or forearms; and
- to enable the animal to walk freely without hobbling its movements.

The present animal training apparatus is comprised of a leash connector attached to a chest portion of a harness. The harness is arranged for preventing the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for controlling an animal by pulling the chest strap in the appropriate direction. For example, it can apply a rotating force to the animal when the animal moves forwards of the handler and pulls on the leash connector. The animal is prevented by the rotational force from pulling further.

DETAILED DESCRIPTION OF THE INVENTION

Figure 1:
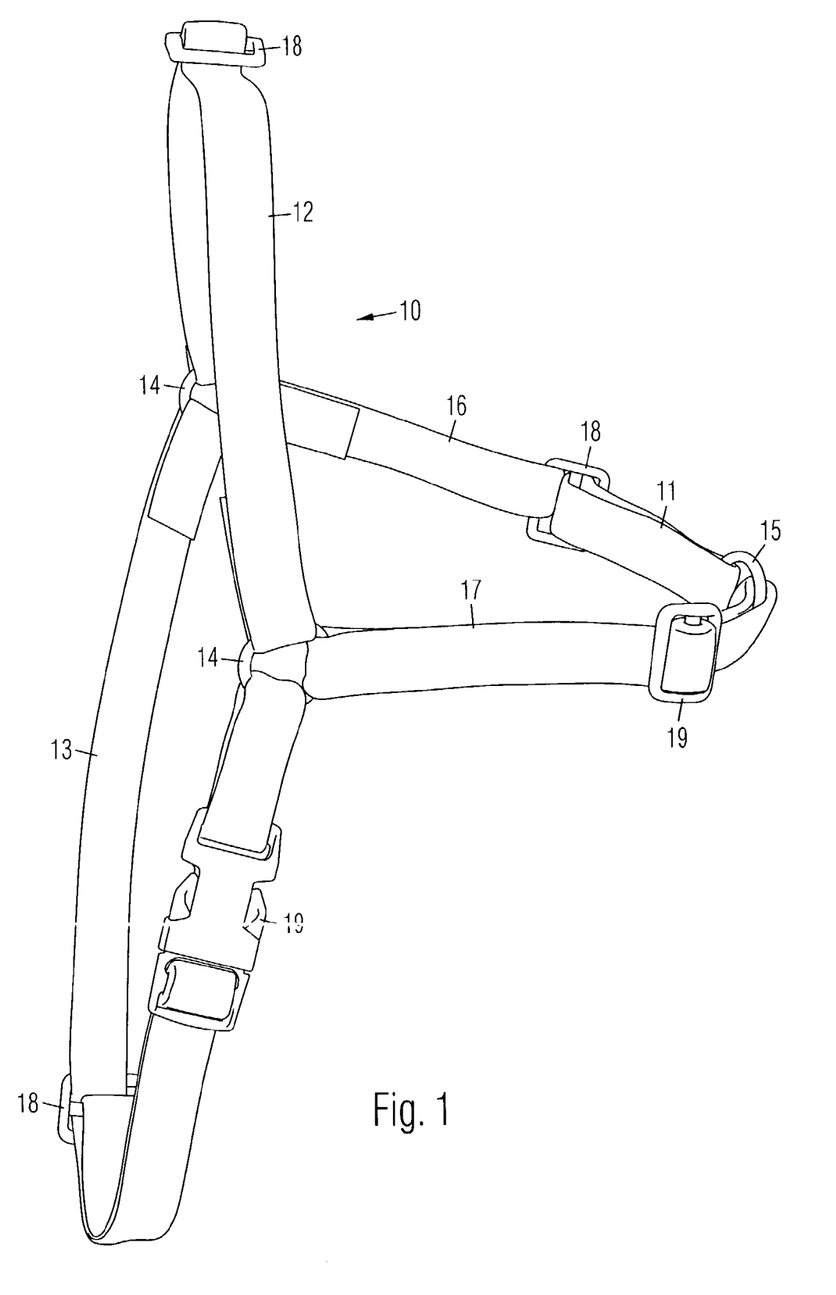
FIG. 1 is a side perspective view of the present animal training apparatus.

FIG. 1:

In accordance with a first embodiment of the invention shown in the front view of FIG. 1, an animal harness 10 is comprised of a chest strap 11, a withers strap 12, and a girth strap 13 which are preferably made of webbing. Adjacent ends of straps 11–13 are connected together, preferably by side connectors 14 which are preferably comprised of rings that allow chest strap 11 to pivot up and down. Alternatively, the ends of straps 11–13 may be connected together without a connector, such as by sewing, gluing, etc., or they may be integrally connected to each other.

A leash connector 15 is attached to an intermediate position on chest strap 11. In this example, chest strap 11 is comprised of a left strap 16 and a right strap 17 connected by leash connector 15, which is comprised of a ring. Alternatively, chest strap 11 may be comprised of a single strap, and leash connector 15 may be attached to an intermediate position or any other position on the single strap. Also, leash connector 15 may be any suitable type of connector for connecting to a leash. There may be a plurality of leash connectors on chest strap 11.

Withers strap 12 and girth strap 13 each includes at least one length adjuster 18, such as a slide buckle, for adjusting its length to fit different size animals. Chest strap 11 preferably includes two width adjusters 18 on either side of leash connector 15, so as to enable adjusting the length of chest strap 11, and preferably maintaining leash connector 15 generally centered along chest strap 11. Alternatively, length adjusters 18 may be eliminated and straps 11–13 may be sized to fit an animal of a predetermined size.

A releasable connector 19 is attached along one of the straps, preferably girth strap 13. An identification tag (not shown) or a cord (not shown) may be attached to leash connector 15 for connecting a leash.

Figure 2:
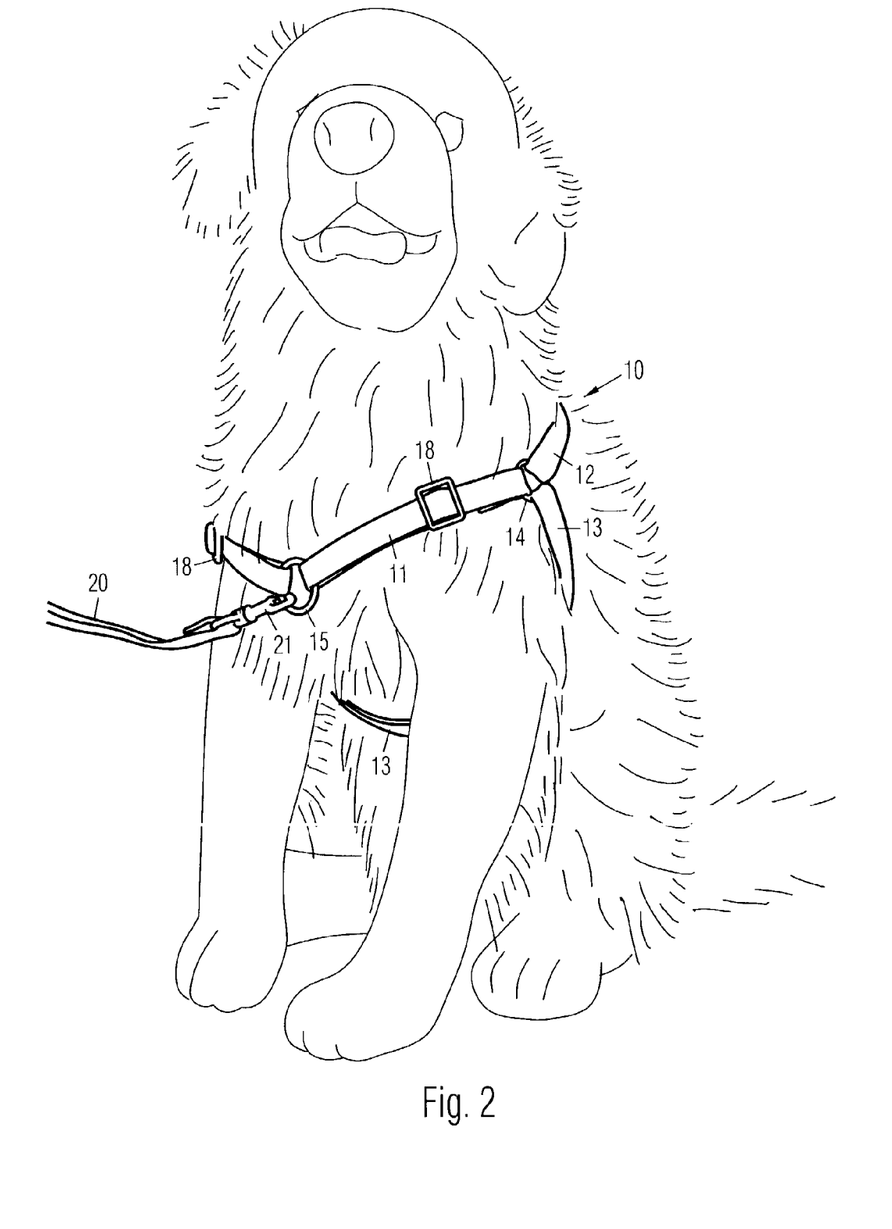
FIG. 2 is a front perspective view thereof on an animal.
Figure 3:
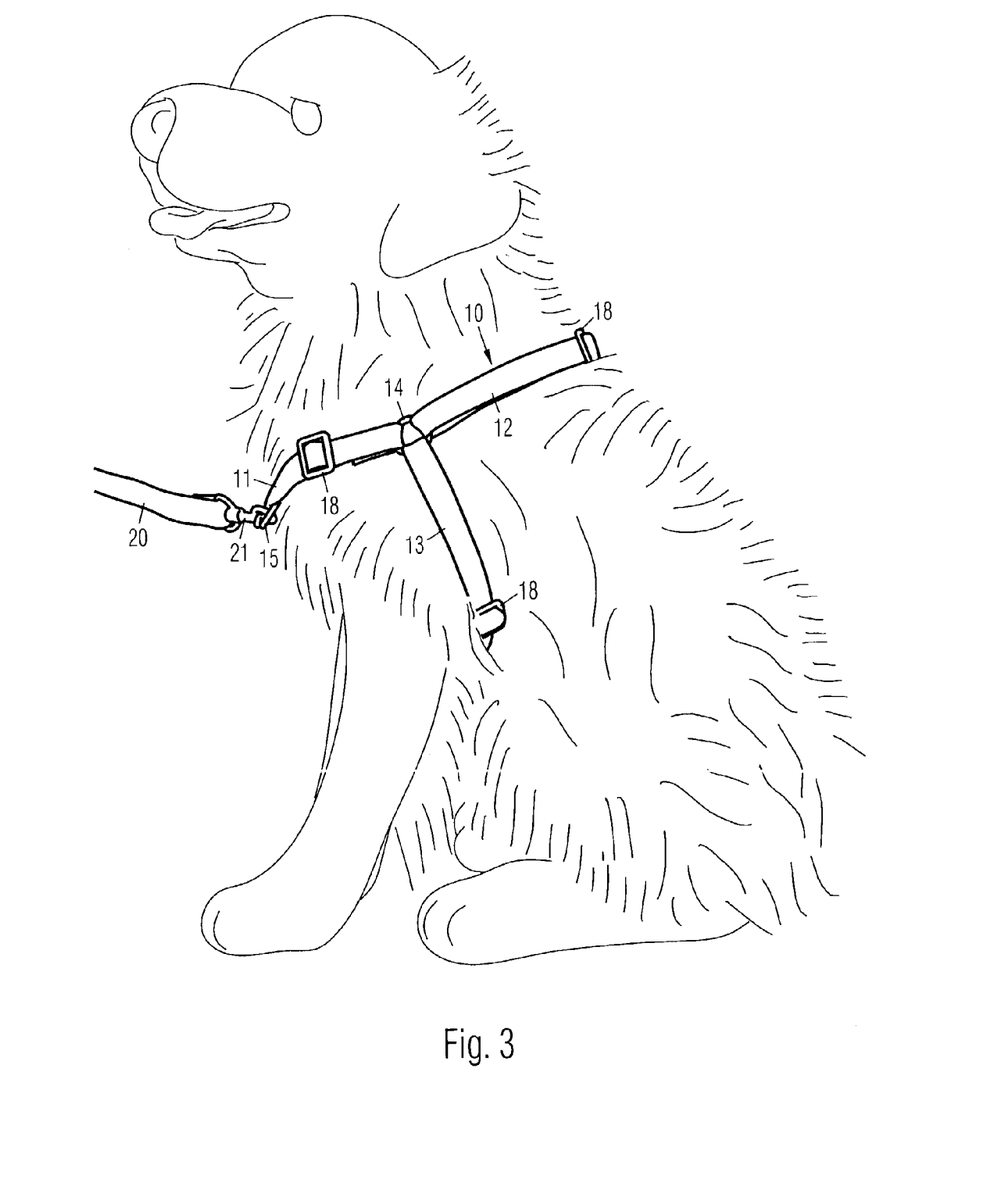
FIG. 3 is a side view thereof on the animal.

FIGS. 2–3:

In FIGS. 2 and 3, harness 10 is shown worn on animal, which is a dog in this example. Harness 10 is most suitable for dogs, but it may be used for other four legged animals. Releasable connector 19 (FIG. 1) is disconnected for enabling harness 10 to be put on the animal by sliding chest strap 11 and withers strap 12 down around its neck without lifting its legs. Releasable connector 19 is reconnected after chest strap 11 and withers strap 12 are in position. Chest strap 11 is positioned across the chest, which is the portion between the tops of the front legs. Withers strap 12 is positioned across the withers, which is the portion between the shoulders behind the neck. Girth strap 13 is positioned across the girth, which is the portion on the underside behind the front legs. A leash 20 with a releasable connector 21 at a proximal end is connected to leash connector 15 on chest strap 11.

Length adjusters 18 on straps 11–13 are adjusted to fit the animal. Side connectors 14 are generally positioned at the shoulders where the animal can easily feel them for receiving turning signals. Chest strap 11 is preferably adjusted to be loose enough for pivoting up and down about side connectors 14. Harness 10 is comfortable to wear because it may be worn relatively loosely, and because it does not rub the armpits or forearms like some prior art harnesses do. It allows the animal to walk freely without hobbling its movements.

Figure 4:
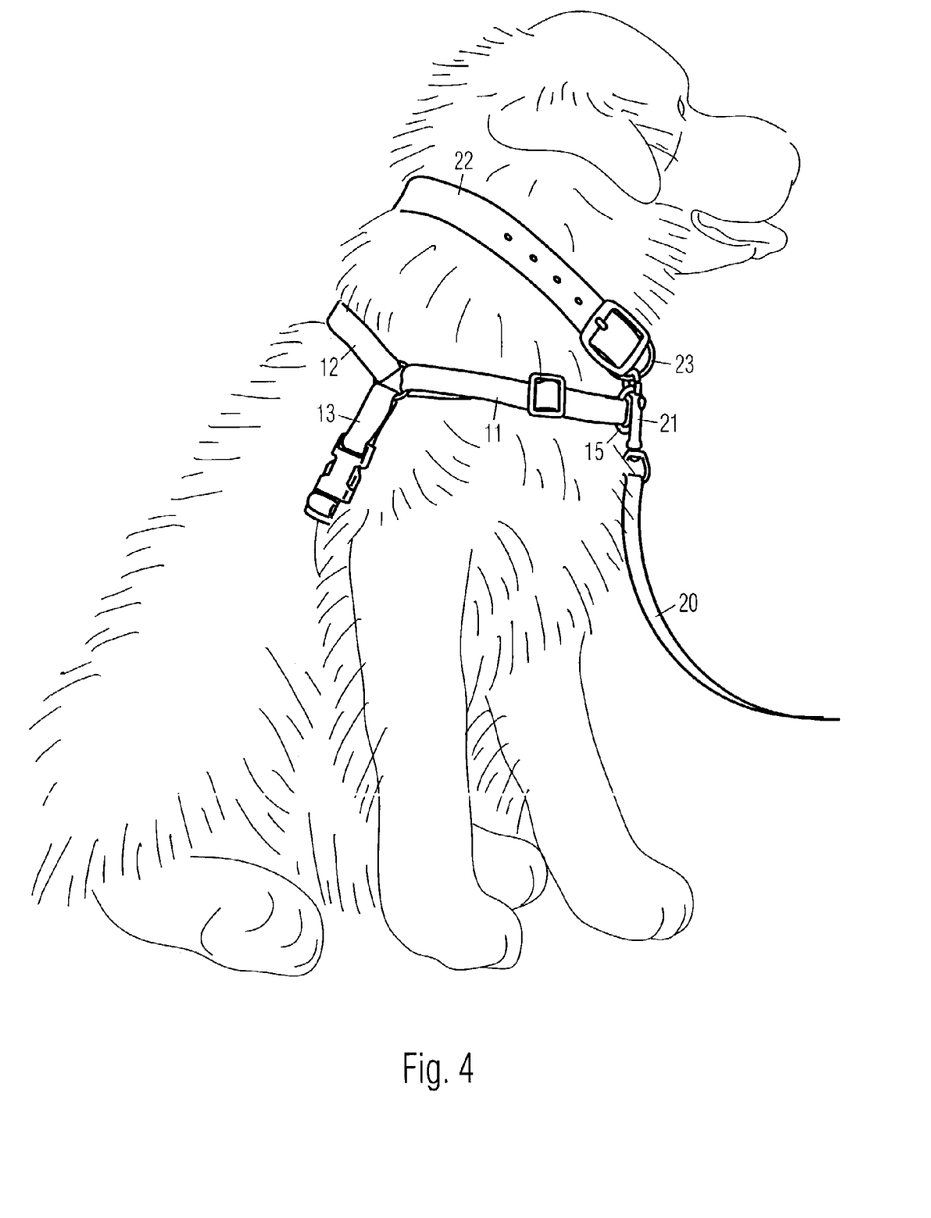
FIG. 4 is a side view of an alternative embodiment thereof.

FIG. 4:

An alternative embodiment of the harness is shown in FIG. 4. It includes a collar 22 worn above chest strap 11 and withers strap 12. A leash connector 23 on collar 22 is connected to leash connector 15 on chest strap 11 by releasable connector 21 on leash. Collar 22 provides additional control and signaling as well as enables an easier transition for an animal owner who is accustomed to using a collar alone. When the owner is familiar with using the harness, collar 22 may be removed.

Figure 5:
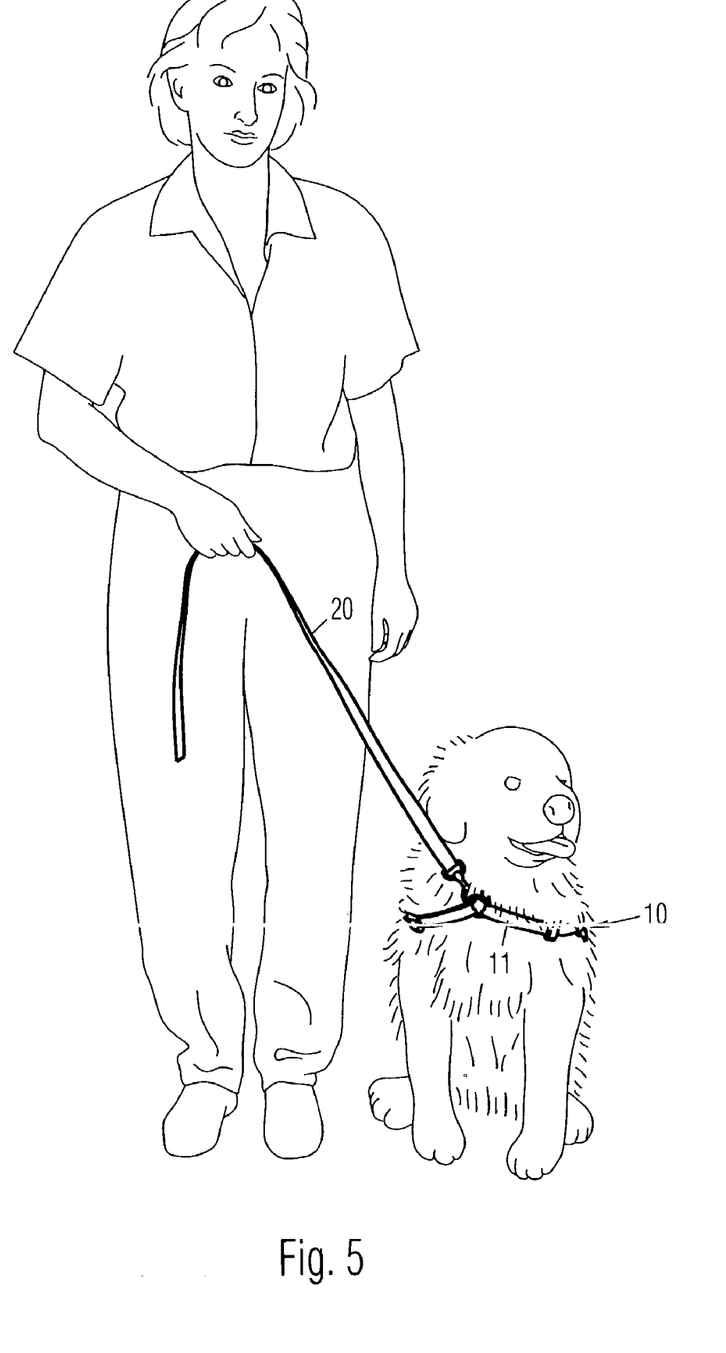
FIG. 5 is a front view thereof when the animal is being instructed to proceed forward.
Figure 6:
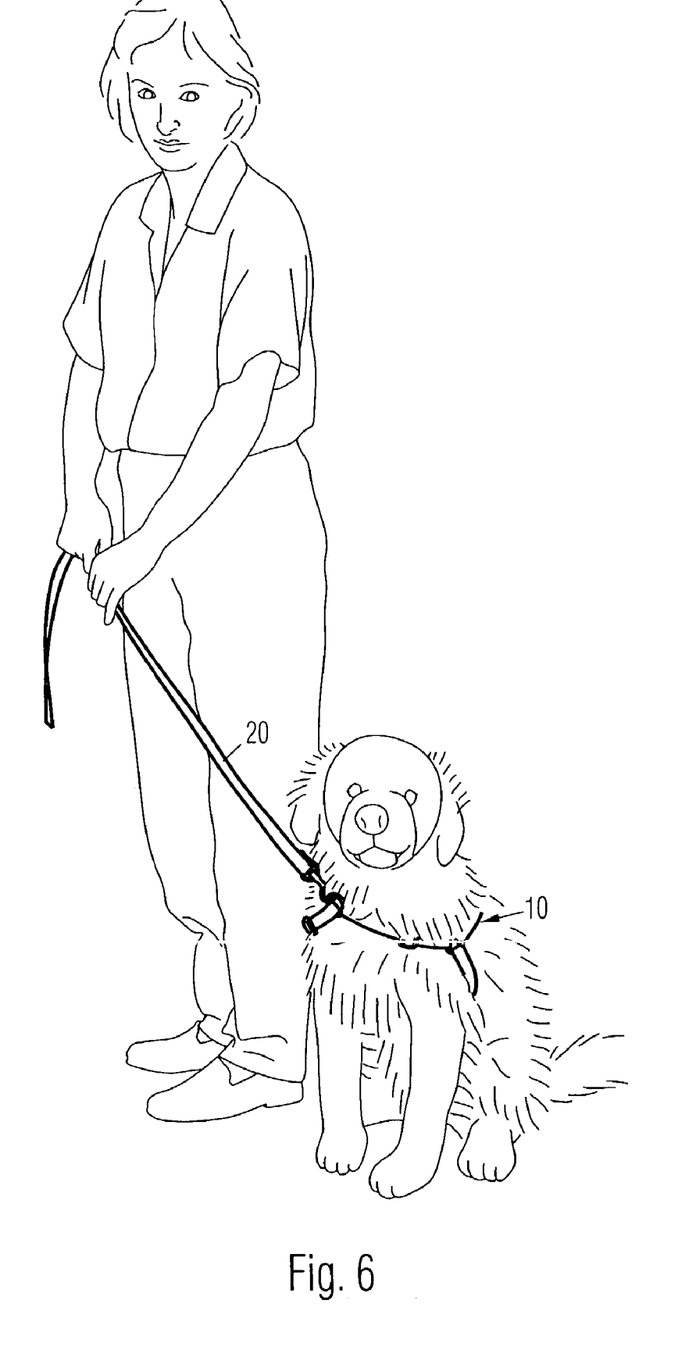
FIG. 6 is a front view thereof when the animal is being instructed to turn right.
Figure 7:
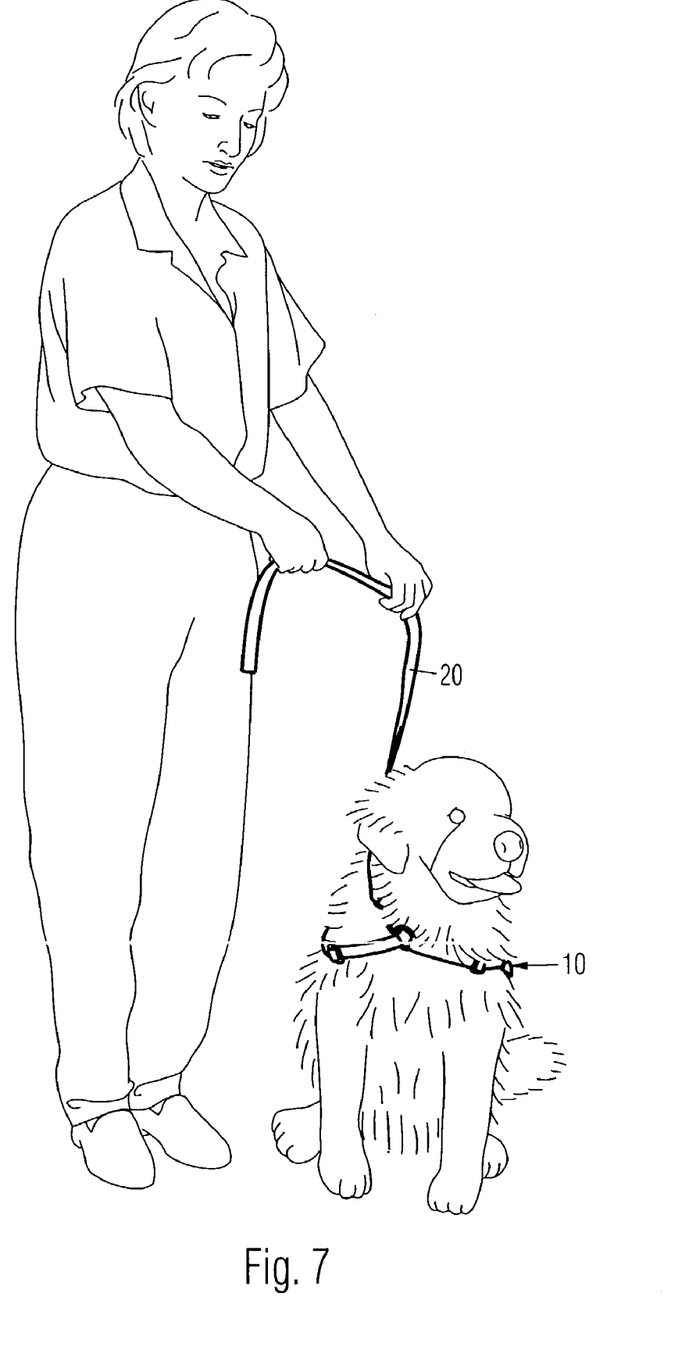
FIG. 7 is a front view thereof when the animal is being instructed to turn left.

FIGS. 5–7:

A method for training the animal wearing harness 10 is shown in FIGS. 5–7. As an example, a trainer is shown on the right of the animal, but the trainer may be on the left instead. In FIG. 5, the animal is instructed to proceed forward by pulling leash 20 forward to apply pressure on the animal's withers and girth. If the animal moves forwards of the trainer and pulls leash 20 taut, leash connector 15 (FIG. 1) and leash 20 apply a force to the sides and shoulders of the animal to produce a rotational effect on the animal since leash connector 15 and leash 20 are attached to chest strap 11. The animal is signaled to turn toward the trainer and stopped from pulling on leash 20. Harness 10 eliminates the signals that prior art leashes and harnesses provide to cause the animal to pull on leash 20. The animal will quickly learn to walk with the trainer instead of forcing its way ahead and pulling on leash 20. The animal is instructed to sit or to stop walking by pulling leash 20 upward to apply pressure on the animal's girth.

In FIG. 6, the animal is instructed to turn right by pulling leash 20 to the right to apply pressure to the animal's left shoulder. In FIG. 7, the animal is instructed to turn left by pulling leash 20 to the left to apply pressure to the right side of the animal's neck. If the animal is on the trainer's right side, the animal is instructed to turn right by pulling leash 20 to the right to apply pressure to the left side of the animal's neck.

SCOPE

Although the above description is specific, they should not be considered as limitations on the scope of the invention, but only as examples of the embodiments. Many substitutes and variations are possible within the teachings of the invention. For example, the harness may be used with a collar or without the leash by grabbing the chest strap and pulling it in the appropriate direction. A collar may be considered as being comprised of a chest strap and a withers strap. The buckles may be replaced with hook-and-loop fasteners. A different harness may be provided for securing the leash connector at the chest of the animal. Therefore, the scope of the invention should be determined by the appended claims and their legal equivalents, not by the examples given.

I claim:

1. An animal training apparatus, comprising:
   f) a forechest strap for positioning across a forechest of an animal between tops of front legs thereof;
   g) a back strap for positioning across a back of the animal behind a neck and between shoulders thereof;
   h) a girth strap for positioning across a girth of the animal behind the front legs on an underside thereof, wherein respective opposite ends of the forechest strap, the back strap, and the girth strap are connected together;
   i) a leash connector attached to an intermediate position on the forechest strap for applying a rotational force to the animal when the animal moves forwards of a handler and pulls on the leash connector, thus preventing the animal from pulling further; and
   j) a leash connected to the leash connector;
   k) a pair of width adjusters along the forechest strap on either side of the leash connector to enable maintaining the leash connector generally centered along the forechest strap.

2. An animal training apparatus, comprising:
   l) a forechest strap for positioning across a forechest of an animal between tops of front legs thereof;
   m) a back strap for positioning across a back of the animal behind a neck and between shoulders thereof;
   n) a girth strap for positioning across a girth of the animal behind the front legs on an underside thereof, wherein respective opposite ends of the forechest strap, the back strap, and the girth strap are connected together;
   o) a leash connector attached to an intermediate position on the forechest strap for applying a rotational force to the animal when the animal moves forwards of a handler and pulls on the leash connector, thus preventing the animal from pulling further; and
   p) a leash connected to the leash connector;
   q) a collar for being worn around the neck of the animal and
   r) a second leash connector on the collar connected to the leash connector on the forechest strap via the snap of a leash.

3. An animal training apparatus, comprising:
   a) a forechest strap that can be positioned low across a forechest of an animal across its shoulders;
   b) a back strap that can be positioned across a back of the animal at or behind its shoulders;
   c) a girth strap that can be positioned across a girth of the animal behind the front legs on an underside; wherein
   d) respective opposite ends of the forechest strap, the back strap, and the girth strap are connected together; and
   e) a leash connector attached to an intermediate position on the forechest strap that allows for the controlling and training of the animal by pulling the forechest portion of the strap and thereby selectively applying pressure behind the animal's shoulders, under the girth, and over the back;
   f) pair of width adjusters along the forechest strap on either side of the leash connector to enable the leash connector to remain generally centered along the forechest strap.

4. An animal training apparatus, comprising:
   a) a forechest strap that can be positioned low across a forechest of an animal across its shoulders;

b) a back strap that can be positioned across a back of the animal at or behind its shoulders;
c) a girth strap that can be positioned across a girth of the animal behind the front legs on an underside; wherein
d) respective opposite ends of the forechest strap, the back strap, and the girth strap are connected together; and
e) a leash connector attached to an intermediate position on the forechest strap that allows for the controlling and training of the animal by pulling the forechest portion of the strap and thereby selectively applying pressure behind the animal's shoulders, under the girth, and over the back;
f) side connectors connecting adjacent ends of the forechest strap, the back strap, and the girth strap, wherein the side connectors can be positioned at the shoulders of the animal, wherein the side connectors comprise rings that enable the forechest strap to pivot up and down.

5. An animal training apparatus, comprising:
a) a forechest strap that can be positioned low across a forechest of an animal across its shoulders;
b) a back strap that can be positioned across a back of the animal at or behind its shoulders;
c) a girth strap that can be positioned across a girth of the animal behind the front legs on an underside; wherein
d) respective opposite ends of the forechest strap, the back strap, and the girth strap are connected together; and
e) a leash connector attached to an intermediate position on the forechest strap that allows for the controlling and training of the animal by pulling the forechest portion of the strap and thereby selectively applying pressure behind the animal's shoulders, under the girth, and over the back;
f) a collar that can be worn around the neck of the animal, and a second leash connector on the collar connected to the leash connector on the forechest strap via the snap of a leash.

6. A method for training a four-legged animal, comprising:
a) providing a harness comprising:
  1) a forechest strap for positioning low across a forechest of an animal, crossing the chest bone between tops of front legs and the neck of the animal;
  2) A back strap for positioning across a back of the animal behind a neck and between shoulders;
  3) a girth strap for positioning across a girth of the animal behind the front legs on an underside; wherein
  4) respective opposite ends of the forechest strap, the back strap, and the girth strap are connected together; and
  5) a leash connector attached to an intermediate position on the forechest strap for controlling and training the animal by pulling the forechest portion of the strap and thereby applying pressure to the animal's shoulders;
b) controlling the animal by pulling on the forechest portion of the harness in different directions, thereby applying pressure selectively to behind the shoulders, the lower girth, or the back.

7. The method for training an animal of claim 6, the method further comprising:
a) controlling the animal by pulling on the forechest portion of the harness upwards to train the animal to stop.

8. The method for training an animal of claim 6, the method further comprising:

a) controlling the animal by pulling on the forechest portion of the harness forward to train the animal to move forward.

9. The method for training an animal of claim 6, the method further comprising:
a) controlling the animal by pulling on the forechest portion of the harness to the left to train the animal to turn to the left.

10. The method for training an animal of claim 6, the method further comprising:
a) controlling the animal by pulling the leash to the left to apply pressure to the right side of the animal's neck to train it to turn to the left.

11. The method for training an animal of claim 6, the method further comprising:
a) controlling the animal by pulling on the forechest portion of the harness to the right to train the animal to turn to the right.

12. The method for training an animal of claim 6, the method further comprising:
a) controlling the animal by pulling the leash to the right to apply pressure to the left side of the animal's neck to train it to turn to the right.

13. The method for training an animal of claim 6, the method further comprising:
a) controlling the animal by pulling on the forechest portion of the harness upwards to train the animal to sit.

14. The method for training an animal of claim 6, the method further comprising:
a) controlling the animal by pulling on the forechest portion of the harness upwards to train the animal to not jump.

15. The method for training an animal of claim 6, the method further comprising:
a) controlling the animal by pulling on the forechest portion of the harness downwards to train the animal to lie down.

16. An animal training apparatus, comprising:
a) a forechest strap that can be positioned across a forechest of an animal between tops of front legs thereof;
b) a back strap that can be positioned across a back of the animal behind a neck and between shoulders thereof;
c) a girth strap that can be positioned across a girth of the animal behind the front legs on an underside thereof, wherein respective opposite ends of the forechest strap, the back strap, and the girth strap are connected together;
d) a leash connector attached to an intermediate position on the forechest strap that can transmit a rotational force to the animal when the animal moves in front of a handler and pulls on the leash connector, thus preventing the animal from pulling further;
e) a pair of width adjusters along the forechest strap on either side of the leash connector to enable maintaining the leash connector generally centered along the forechest strap.

17. An animal training apparatus, comprising:
a) a forechest strap that can be positioned across a forechest of an animal between tops of front legs thereof;
b) a back strap that can be positioned across a back of the animal behind a neck and between shoulders thereof;
c) a girth strap that can be positioned across a girth of the animal behind the front legs on an underside thereof, wherein respective opposite ends of the forechest strap, the back strap, and the girth strap are connected together;
d) a leash connector attached to an intermediate position on the forechest strap that can transmit a rotational force to the animal when the animal moves in front of a handler and pulls on the leash connector, thus preventing the animal from pulling further;
e) a collar for being worn around the neck of the animal and
f) a second leash connector on the collar connected to the leash connector on the forechest strap via the snap of a leash.

* * * * *